3,813,461
PROCESS FOR PRODUCING POROUS ARTICLES
OF POLYTETRAFLUOROETHYLENE
Naohiro Murayama, Takayuki Katto, and Shinichiro Funabashi, Iwaki, Japan, assignors to Kureha Kagaku Kogyo Kabushiki Kaisha, Tokyo, Japan
No Drawing. Filed Feb. 3, 1972, Ser. No. 223,300
Claims priority, application Japan, Feb. 3, 1971, 46/3,937; Nov. 10, 1971, 46/89,084
Int. Cl. B29c 5/00
U.S. Cl. 264—41                                                27 Claims

ABSTRACT OF THE DISCLOSURE

A porous article of polytetrafluoroethylene having fine open cells and having high strength and pliability is produced by stretching a sheet of polytetrafluoroethylene at least biaxially. A porous film of polytetrafluoroethylene having especially large gas-permeability is obtained by performing the above stretching in a liquid, such as carbon tetrachloride or methanol, which is a non-solvent for polytetrafluoroethylene and is capable of wetting polytetrafluoroethylene or penetrating into the fine pores formed in the sheet during stretching. The product finds a wide range of applications including filters for strongly corrosive gases or diaphragms for separating isotopes or uranium concentration.

---

This invention relates to a process for producing a porous article of polytetrafluoroethylene, and more specifically, to a process for producing a porous polytetrafluoroethylene article containing fine open cells and having high strength and good pliability by stretching a sheet of polytetrafluoroethylene at least biaxially.

As is well known, polytetrafluoroethylene resins are useful in a wide range of industrial applications because of their superior resistance to heat and chemicals, mechanical properties and electrical insulation and very low water imbibition. Porous articles made of polytetrafluoroethylene resins, because of their properties mentioned above, find applications as filters for strongly corrosive substances or high temperature substances. They are also useful as electrolysis diaphragms, and diaphragms for fuel cells or alkali cells, and diaphragms for separating isotopes, and especially effective for uranium concentration using uranium hexafluoride having a strong corrosive action.

Since polytetrafluoroethylene has high viscosity even at a temperature above its melting point and does not exhibit flowability, the foaming method encounters difficulties of producing an open-cellular porous article of polytetrafluoroethylene having high strength. Furthermore, no solvent for polytetrafluoroethylene exists at present, and therefore, porous articles of polytetrafluoroethylene cannot be produced by a method comprising forming a gel of polytetrafluoroethylene using a solvent, a plasticizer, a non-solvent or the like, and extracting or evaporating the solvent, etc. from the gel.

Hence, porous articles of polytetrafluoroethylene have usually been produced by a method comprising mixing polytetrafluoroethylene with a soluble organic or inorganic finely divided substance, moldiing the mixture, and then removing the finely divided substance by dissolving, or by a method comprising sintering polytetrafluoroethylene. The first of these methods has the defect that the finely divided substance tends to remain in the molded article.

An object of this invention is to provide a process for producing a porous polytetrafluoroethylene article containing fine open cells and having high strength, good pliability and large gas-permeability by stretching a sheet of polytetrafluoroethylene at least biaxially.

Another object of this invention is to provide a process for producing a porous film of polytetrafluoroethylene containing fine open cells and having high strength, good pliability and large gas-permeability by stretching a sheet of polytetrafluoroethylene at least biaxially in a non-solvent for polytetrafluoroethylene.

According to this invention, there is provided a process for producing a porous article of polytetrafluoroethylene, which comprises stretching a sheet of polytetrafluoroethylene in at least two directions to 1.5 to 5 times the original dimension in each direction at a temperature of from $-10°$ C. to $200°$ C.

When a polytetrafluoroethylene sheet is stretched in one direction, the stretched sheet has little or no gas-permeability and has hardly any practical value. But by stretching the sheet biaxially, it attains large gas-permeability. The size of the fine pores formed in the stretched sheet is very small, and the pressure dependence of the gas-permeability is extremely small.

The fact that the porous polytetrafluoroethylene sheet obtained by the present invention has open cells is demonstreated by its possession of large gas-permeability (for example, $$10^{-6} \frac{\text{mol} \cdot \text{mm.}}{\text{cm.}^2 \cdot \text{min.} \cdot \text{cm. Hg}}$$

in the case of air). Furthermore, the cells or pores formed in the stretched sheet are fine, and those having a size below about the mean free path of a permeating gas such as oxygen or nitrogen are predominant. This can be assumed from the following fact. If the size of the pores is above and about the mean free path of the permeating gas molecules, a majority of the permeating gas flow constitutes a viscous flow, and therefore, the pressure dependence of the permeability is large. On the other hand, if the pore size is below the mean free path of the permeating gas molecules, a molecular flow is predominant, and the pressure dependence of the gas-permeability is small. If the molecular flow occurs ideally, there is no pressure dependence of gas-permeability.

The porous sheet of polytetrafluoroethylene obtained by the present invention has a very small pressure dependence of gas-permeability, and it can be assumed that its pore size is fine.

Another advantage of the present invention is that porous polytetrafluoroethylene articles of small impurity content can be obtained. For example, if a commercially available polytetrafluoroethylene sheet is used as the starting material, no impurities other than those contained in the starting sheet exist in the resulting porous article since no additive or mixture is used in the process of producing the porous article.

Another great feature of the invention is that the process can be performed by a very simple procedure of stretching. Since the stretching operation may also be performed at room temperature, it does not require a heating or cooling step, and this renders the process simpler.

Furthermore, according to the invention, there can be obtained porous polytetrafluoroethylene articles of uniform quality which have high strength, excellent surface characteristics, and bending properties. Of course, the porous articles obtained by the invention have resistances to heat and chemicals and other desirable properties inherent to polytetrafluoroethylene.

Because of the above-mentioned characteristics, the porous polytetrafluoroethylene articles obtained by the process are useful as diaphragms for diffusion and separation of rare gases, isotope gases, etc., especially for the concentration and separation of corrosive gases such as uranium hexafluoride or boron trifluoride. They are also expected to find applications in various other fields such as filters or cell diaphargams, utilizing the characteristics of polytetrafluoroethylene resins.

The process of this invention will be described in detail below.

First, a commercially available polytetrafluoroethylene sheet is stretched uniaxially at a predetermined temperature and at a predetermined stretch ratio. The stretching temperature is desirably from −10° C. to 200° C. but for optimum results, a temperature of 19° C. to 30° C. (room temperature) are preferred. At temperatures below −10° C., the polytetrafluoroethylene sheet becomes brittle, and becomes susceptible to breakage during stretching. If the temperature exceeds 200° C., only very fine pores are obtained with a stretch ratio of about 5, and further stretching will result in a tendency of forming large pinholes in the stretched sheet.

The stretch ratio, although varying according to such factors as stretching temperature, should desirably be between 1.5 and 5.

The thickness of the polyteterafluoroethylene sheet is not particularly limited so long as the sheet can be stretched. For ease of stretching, however, the thickness should desirably be 20 to 1,000 microns.

In most cases, the uniaxially stretched sheet hardly has gas-permeability. Even if it has, the gas-permeability is far smaller than that of a biaxially stretched sheet of polytetrafluoroethylene.

Subsequently, the steretched sheet is similarly stretched, for example, in a direction at right angles to the direction of the first stretching. The choice of the stretching temperature and ratio is made in quite the same manner as in the first stretching. Specifically, the stretching temperature of −10° C. to 200° C. and the stretch ratio of between 1.5 and 5 are desirable in order to render the quality of the product more uniform and the product more porous.

If desired, the porous sheet of polytetrafluoroethylene obtained by the above-mentioned first and second stretchings may be heat-treated under tension or in a relaxed condition in order to improve the dimensional stability of the porous sheet. This heat-treatment brings about a reduction in stress. The heat-treatment temperature may be any point below the melting point of the porous sheet, at which the stress reduction occurs relatively rapidly. For example, when a 500μ thick polytetrafluoroethylene sheet has been stretched at room temperature at a stretch ratio of about 3, the heat-treatment under tension is usually performed at 150° C. for about 10 minutes. Shrinkage of the sheet after releasing of the tension is only to a slight degree.

By this second stretching, the polytetrafluoroethylene sheet becomes a porous sheet having large gas-permeability. For example, when a 500μ-thick polytetrafluoroethylene sheet is stretched at room temperature (23° C.) biaxially at a stretch ratio of 3 in each direction, there can be obtained with ease a porous sheet having a gas-permeability of the order of $$10^{-7} \frac{\text{mol·mm.}}{\text{cm.}^2\text{·min.·cm. Hg}}$$

or above. The resulting porous polytetrafluoroethylene sheet is of uniform quality with toughness and bending properties and superior surface characteristics.

In the above-mentioned biaxial stretching, the two stretchings are performed separately. But the stretching may be carried out simultaneously in two directions. The temperature and ratio of the simultaneous biaxial stretching are the same as those mentioned above. In other words, the stretching temperature is in the range of −10° C. to 200° C., and the stretch ratio is 1.5 to 5 in each direction.

The repetitive stretching and shrinking operation in each of the above-mentioned biaxial stretching methods, and stretchings in more directions are also within the scope of the present invention.

According to another aspect of the invention, there is provided a process for producing a porous film of polytetrafluoroethylene, which comprises stretching a sheet of polytetrafluoroethylene at least biaxially at a temperature of from −10° C. to 200° C. at a stretch ratio in each direction between 1.5 and 5 in a non-solvent liquid having a surface tension of a degree such that the liquid can penetrate into the fine pores formed during stretching.

By stretching the polytetrafluoroethylene sheet in at least two directions in a non-solvent for polytetrafluoroethylene which can wet polytetrafluoroethylene to a degree such that it can penetrate into the fine pores formed during stretching (for example, acetone, ethanol or methanol), there can be obtained a porous film having a larger gas-permeability than in the case of stretching the sheet in at least two directions at the same temperature and ratio in air or in a liquid, such as water or glycerin, which has a large surface tension of a degree such that it does not penetrate into the pores formed during stretching.

The fact that the porous polytetrafluoroethylene film obtained by the invention has open cells is demonstrated by its possession of a large gas-permeability, for example, $$1\text{–}2 \times 10^{-5} \frac{\text{mol (Ar)}}{\text{cm.}^2\text{·min.·cm. Hg}}$$

and the small pressure dependence of the gas-permeability indicates that the resulting cells or pores are fine in size.

The porous film of polytetrafluoroethylene has the same advantage and utilities as mentioned above with respect to the porous article of polytetrafluoroethylene, but its large gas-permeability renders it more effective in applications where such large gas-permeability is desirable.

The process for producing such porous film is also substantially the same as that described above. First, a sheet of polytetrafluoroethylene is uniaxially stretched at a prescribed temperature and a prescribed stretch ratio in a non-solvent liquid for polytetrafluoroethylene. The stretching temperature is from −10° C. to 200° C., but for optimum results, temperatures of 19 to 30° C. (room temperature) are preferred. At a temperature below −10° C., the sheet is susceptible to breakage even if the stretch ratio is small, and at a temperature above 200° C. stretching does not render the sheet porous, and large pores perceptible to the naked eye tend to occur during stretching. As hereinbefore described, the stretch ratio is desirably between 1.5 and 5 in each direction, and the starting polytetrafluoroethylene sheet should desirably have a thickness of 20 to 1,000 microns.

The non-solvent liquid used in the invention should wet the starting polytetrafluoroethylene sheet, or should have a surface tension such that it can penetrate into fine pores formed when the starting polytetrafluoroethylene sheet is stretched uniaxially at a stretch ratio of about 1.5–2. Polytetrafluoroethylene has a critical surface tension of as small as 18.5 dyne/cm., and liquids which wet polytetrafluoroethylene are not many. Examples of the non-solvent liquid that can be used in this invention include methanol (22.5 dyne/cm.), ethanol (22.55 dyne/cm.), propanol (23.7 dyne/cm.), 1-butanol (24.7 dyne/cm), 1-pentanol (25.7 dyne/cm.), ethyl ether (17.0 dyne/cm.), acetone (23.3 dyne/cm.), carbon tetrachloride (26.8 dyne/cm.), hexane (18.4 dyne/cm.), heptane (20.3 dyne/cm.), octane (21.7 dyne/cm.), decane (23.9 dyne/cm.), and n-undecane (24.7 dyne/cm.). From the standpoint of ease of penetration into the fine pores formed during stretching, the non-solvent liquid should desirably have a surface tension of not more than 35 dyne/cm. at the stretching temperature. The surface tension values given in the parentheses above are those measured at 20° C. Mixed liquids or aqueous solutions of surface active agents having a surface tension of not more than 35 dyne/cm. at the stretching temperature can also be used in the present invention.

If a polytetrafluoroethylene sheet is stretched uniaxially in the absence of the non-solvent liquid described above, for example, in air, the sheet is whitened. But when it is stretched in the non-solvent liquid, the sheet becomes apparently transparent to semi-transparent as a result of penetration of the liquid into the fine pores. On the other hand, when the sheet is stretched in a liquid having a large surface tension such as water or glycerin, the liquid cannot penetrate into fine pores that may be formed at the first or second stretching, and the sheet is white to non-transparent even in the liquid. After the end of the first stretching, the stretched polytetrafluoroethylene sheet is porous, but its gas-permeability is still very small.

Subsequently, the stretched sheet is stretched at $-10°$ C. to 200° C. and at a stretch ratio between 1.5 and 5 in a non-solvent liquid having a surface tension of not more than 35 dyne/cm. and being capable of penetrating into the fine pores of the stretched sheet. Usually, the non-solvent liquid used in the first stretching is also used for the second stretching, but other liquids which meet the requirement described above may be used in the second stretching.

If desired, after the first and second stretchings, the stretched sheet may be heat-treated under tension or in a relaxed condition in order to reduce stress, and to improve the dimensional stability of the resulting porous film. The heat-treatment temperature may be any point below the melting point of the polytetrafluoroethylene film at which a reduction in stress occurs relatively rapidly. For example, when a 300$\mu$-thick polytetrafluoroethylene sheet has been stretched at room temperature to about 3 times its original dimension, the heat-treatment under tension may be carried out for about 30 minutes at 150° C. with only a slight change in dimension after releasing of the tension.

By this second stretching in the non-solvent liquid, the polytetrafluoroethylene sheet becomes a porous sheet having a large gas-permeability. The thus obtained porous polytetrafluoroethylene sheet has a larger gas-permeability than in the case of stretching at the same stretching temperature and at the same stretch ratio in air, water of glycerin.

If, for example, a polytetrafluoroethylene piece having a thickness of 300$\mu$, a width of 7 cm., and a length of 6 cm. has been stretched in acetone at 23° C. at a stretch ratio of 3.0, and then at a stretch ratio of about 2.5, the resulting porous polytetrafluoroethylene film has an argon gas-permeability of about $$1.5 \times 10^{-5} \frac{\text{mol}}{\text{cm.}^2 \cdot \text{min.} \cdot \text{cm. Hg}}.$$

When the same polytetrafluoroethylene piece is stretched in air under the same conditions, it is difficult to produce a porous film having an argon gas-permeability of $$10^{-5} \frac{\text{mol}}{\text{cm.}^2 \cdot \text{min.} \cdot \text{cm. Hg}}.$$

The repetitive stretching and shrinking operation in the abovementioned stretching method, and multiaxial stretchings are also within the scope of the present invention for obtaining more porous films of polytetrafluoroethylene.

The present invention will be specifically described by the following Examples. In the Examples, the pressure dependence of gas-permeability is expressed by changes in the permeability which occur by changing as average pressure $$\bar{P}\left(=\frac{P_1 + P_2}{2}\right)$$

on the sample stretched sheet or film as a diaphragm while maintaining a pressure difference $\Delta P(=P_1-P_2)$ constant. Here, $P_1$ is the pressure on the high-pressure side of the diaphragm, and $P_2$ is the pressure on the low-presssure side.

The air-permeability was measured at room temperature with $\Delta P=40$ cm. Hg, and the unit of air-permeability is $$\frac{\text{mol} \cdot \text{mm.}}{\text{min. cm.}^2 \cdot \text{g}}$$

The thickness shown in the tables shows the thickness of the stretched sheet at a portion used for determining the air-permeability.

The argon gas-permeability was measured using a sample having a diameter of 2 cm. from a portion of the resulting porous film which was near the chuck of the stretching machine. The unit of QAr is $$\frac{\text{mol}}{\text{cm.}^2 \cdot \text{min.} \cdot \text{cm. Hg}}.$$

and QAr was measured with $\Delta P=30$ cm. Hg at the temperature indicated in the respective Examples.

EXAMPLE 1

A commercially available polytetrafluoroethylene sheet having a thickness of 500 microns was stretched at 23° C. to 2.5, 3.0 or 3.5 times the original dimension using a tensile tester (Tensilon UTM-1, Toyo Sokki Company). The original sheet had a width of 20 cm. and a length of 10 cm. at the part to be stretched. The stretching speed was 25 mm./min.

The stretched sheet was heated under tension by a dryer to promote alleviation of stress. The sheet stretched uniaxially at a ratio of 3 was then stretched at a stretch ratio of 2.5 or 3.0 in a direction at right angles to the first stretch direction. Furthermore, the sheet stretched uniaxially at a ratio of 3.5 was similarly stretched at a stretch ratio of 2.75 or 3.0. The conditions for the second stretching were the same as those of the first stretching. After the second stretching, the sheets were heated by a dryer.

The air-permeability of each of the resulting porous sheets and the pressure dependence of the air-permeability are shown in Table 1 below.

TABLE 1

| Sample No. | Stretch ratio | | Thickness (mm.) | Air-permeability | |
|---|---|---|---|---|---|
| | First stretching | Second stretching | | $\bar{P}=20$ cm. Hg | $\bar{P}=40$ cm. Hg |
| 1* | 2.5 | | | Very small | |
| 2* | 3.0 | | | do | |
| 3* | 3.5 | | | do | |
| 4 | 3.0 | 2.5 | 0.32 | $1.20\times10^{-7}$ | $1.20\times10^{-7}$ |
| 5 | 3.0 | 3.0 | 0.30 | $1.16\times10^{-7}$ | $1.16\times10^{-7}$ |
| 6 | 3.5 | 2.75 | 0.30 | $2.61\times10^{-7}$ | $2.65\times10^{-7}$ |
| 7 | 3.5 | 3.0 | 0.30 | $1.63\times10^{-6}$ | $1.65\times10^{-6}$ |

*Control samples.

EXAMPLE 2

A 500$\mu$-thick commercially available polytetrafluoroethylene sheet was stretched biaxially at 23° C. at a stretch ratio of 3.0 in each direction using the Tensilon. The stretch-speed was either 50 mm./min. or 250 mm./min. The air-permeability of each of the stretched sheets and its pressure dependence are given in Table 2.

TABLE 2

| Stretching speed (mm./min.) | Thickness (mm.) | Air-permeability | |
|---|---|---|---|
| | | $\bar{P}=20$ cm. Hg | $\bar{P}=40$ cm. Hg |
| 50 | 0.31 | $4.10\times10^{-7}$ | $4.21\times10^{-7}$ |
| 250 | 0.31 | $2.75\times10^{-7}$ | $2.76\times10^{-7}$ |

EXAMPLE 3

A 300$\mu$-thick commercially available polytetrafluoroethylene sheet was stretched uniaxially at 22° C. at a stretch ratio of 3.0, 3.5 or 4.0. The original sheet had a width of 5 cm. and a length of 5 cm. at a part to be stretched. After stretching, the sheet was heat-treated at 150° C. for 10 minutes under tension.

Similarly, polytetrafluoroethylene sheets were stretched at a stretch ratio of 2.5 and 3.0 in one direction. The stretched sheets were then further stretched at a stretch ratio of 2.5 and 3.0, respectively, in a direction at right angles to the direction of the first stretching.

The air-permeability of each of the stretched polytetrafluoroethylene sheets and its pressure dependence are shown in Table 3 below.

TABLE 3

| Sample No. | Stretch ratio First stretching | Stretch ratio Second stretching | Thickness (mm.) | Air-permeability P=20 cm. Hg | Air-permeability P=40 cm. Hg |
|---|---|---|---|---|---|
| 1* | 3.0 | ---------- | 0.20 | $1.0 \times 10^{-8}$ | ---------- |
| 2* | 3.5 | ---------- | 0.40 | $2.1 \times 10^{-8}$ | ---------- |
| 3* | 4.0 | ---------- | 0.20 | $2.0 \times 10^{-8}$ | ---------- |
| 4 | 2.5 | 2.5 | 0.20 | $2.56 \times 10^{-7}$ | $2.65 \times 10^{-7}$ |
| 5 | 2.5 | 3.0 | 0.20 | $1.28 \times 10^{-7}$ | $1.32 \times 10^{-7}$ |
| 6 | 3.0 | 2.5 | 0.18 | $3.95 \times 10^{-7}$ | $4.21 \times 10^{-7}$ |
| 7 | 3.0 | 3.0 | 0.19 | $2.14 \times 10^{-7}$ | $2.19 \times 10^{-7}$ |

*Control samples.

EXAMPLE 4

A 500µ-thick commercially available polytetrafluoroethylene sheet was stretched at room temperature (23° C.) by the Tensilon. The original sheet had a width of 20 cm. and a length of 8 cm. at a portion to be stretched. The stretching speed was 50 mm./min. Soon after the sheet was stretched to 28 cm. by the first stretching, the sheet was cut by a knife (before stress alleviation occurred fully). The sheet was shrunk to 23 cm.

The stretched sheet was cut so that the length of a portion to be stretched was 8 cm., and stretched to 28 cm. in a direction at right angles to the direction of the first stretching. Immediately thereafter, the stretched sheet was cut by a knife. The sheet was shrunk to 22 cm.

Hence, the actual stretch ratio was 2.88 for the first stretching and 2.75 for the second stretching. The air-permeability of the resulting porous sheet and its pressure dependence are shown in Table 4 below.

TABLE 4

| Thickness (mm.) | Air-permeability P=20 cm. Hg | Air-permeability P=40 cm. Hg |
|---|---|---|
| 0.31 | $1.87 \times 10^{-5}$ | $1.96 \times 10^{-5}$ |

EXAMPLE 5

A 100µ-thick commercially available polytetrafluoroethylene sheet was biaxially stretched in water at a stretch ratio of 3 in each direction using a uniaxial stretcher in the same way as in Example 3. The original sheet had a width of 5 cm. and a length of 5 cm. at a part to be stretched. The stretching temperature (temperature of water) was 0° C. and 15° C.

The air-permeability of each of the stretched sheets and its pressure dependence are shown in Table 5.

TABLE 5

| Stretching temperature (° C.) | Thickness (µ) | Air-permeability P=20 cm. Hg | Air-permeability P=40 cm. Hg |
|---|---|---|---|
| 0 | 40 | $2.06 \times 10^{-7}$ | $2.55 \times 10^{-7}$ |
| 15 | 40 | $2.50 \times 10^{-7}$ | $2.63 \times 10^{-7}$ |

EXAMPLE 6

A 500µ-thick commercially available polytetrafluoroethylene sheet was stretched in a glycerin bath to 3.0 times the original dimension using a uniaxial stretcher. The original sheet had a width of 5 cm. and a length of 5 cm. at a part to be stretched. After stretching, the sheet was washed with water, and heat-treated at 150° C. for 20 minutes. A part of this uniaxially stretched sheet was then stretched at a stretch ratio of 3.0 in this glycerin bath in a direction at right angles to the direction of the first stretching. The stretched sheet was washed with water, and heat-treated at 150° C. for 20 minutes.

The stretching temperatures employed (temperatures of the glycerin bath) were 70° C., 100° C., and 150° C., respectively. The air-permeability of each of the stretched sheets at room temperature and its pressure independence are given in Table 6 below.

TABLE 6

| Sample No. | Stretching temperature (° C.) | Stretch ratio First stretching | Stretch ratio Second stretching | Thickness (mm) | Air-permeability P=20 cm. Hg | Air-permeability P=40 cm. Hg |
|---|---|---|---|---|---|---|
| 1* | 70 | 3 | ---------- | 0.31 | Very small | |
| 2 | 70 | 3 | 3 | 0.29 | $1.60 \times 10^{-7}$ | $1.64 \times 10^{-7}$ |
| 3* | 100 | 3 | ---------- | 0.32 | Very small | |
| 4 | 100 | 3 | 3 | 0.30 | $3.34 \times 10^{-7}$ | $3.4 \times 10^{-7}$ |
| 5* | 150 | 3 | ---------- | 0.30 | Very small | |
| 6 | 150 | 3 | 3 | 0.30 | $4.01 \times 10^{-8}$ | |

*Control samples.

EXAMPLE 7

A commercially available polytetrafluoroethylene sheet (thickness 200µ and 500µ) was stretched at room temperature at a stretch ratio of 3.0 x 2.5 using a biaxial stretcher, and then heat-treated at 150° C. for 10 minutes. The air-permeability of each of the resulting sheets at room temperature was as shown in Table 7 below.

TABLE 7

| Thickness of the original sheet (µ) | Thickness (µ) | Air-permeability at P=20 cm. Hg. |
|---|---|---|
| 200 | 120 | $7.71 \times 10^{-5}$ |
| 500 | 300 | $1.06 \times 10^{-4}$ |

EXAMPLE 8

A 300µ-thick commercially available polytetrafluoroethylene sheet was stretched in carbon tetrachloride at 25° C. at a stretch ratio of 3 using a manually operating uniaxial stretcher, and then heat-treated under tension in a gear oven at 150° C. for 10 minutes. The stretched sheet was stretched in carbon tetrachloride at 25° C. at a stretch ratio of 2.0 in a direction at right angles to the direction of the first stretching. The resulting porous film was then heat-treated under tension in a gear oven at 150° C. for 30 minutes.

In quite the same way, the polytetrafluoroethylene sheet was stretched in carbon tetrachloride at a stretch ratio of 3.0 in one direction and then 2.5 in another direction.

In each case, the starting sheet before the first stretching had a width of 7 cm. and a length of 6 cm.

For comparison, the same polytetrafluoroethylene sheet as above was stretched in air instead of carbon tetrachloride at a stretch ratio of 3.0 in one direction and 2.0 in another direction, at a ratio of 3.0 in one direction and then 2.5 in another direction, or at a stretch ratio of 3.0 in one direction and then 3.0 in another direction. Otherwise the procedure and conditions employed were the same as those employed above.

The argon gas-permeability of each of the stretched films at 28° C. and its pressure dependence are shown in Table 8 below.

TABLE 8

| Sample No. | Atmosphere | Stretch ratio | | QAr ($\bar{P}=15$ cm. Hg) | QAr ($\bar{P}=35$ cm. Hg) |
|---|---|---|---|---|---|
| | | First stretching | Second stretching | | |
| 1 | CCl₄ | 3.0 | 2.0 | $1.84 \times 10^{-5}$ | $1.90 \times 10^{-5}$ |
| 2 | CCl₄ | 3.0 | 2.5 | $1.38 \times 10^{-5}$ | $1.48 \times 10^{-5}$ |
| 3* | Air | 3.0 | 2.0 | $8.71 \times 10^{-6}$ | $9.04 \times 10^{-6}$ |
| 4* | Air | 3.0 | 2.5 | $8.44 \times 10^{-6}$ | $8.94 \times 10^{-6}$ |
| 5* | Air | 3.0 | 3.0 | $8.90 \times 10^{-6}$ | $9.32 \times 10^{-6}$ |

* Control samples.

EXAMPLE 9

A 300μ-thick commercially available polytetrafluoroethylene sheet was stretched biaxially in the same way as in Example 8 in acetone at 25° C. using a manually operating uniaxial stretcher. There was produced one sheet stretched at a ratio of 3.0 in the first stretching and 2.0 in the second stretching, one sheet stretched at a ratio of 3.0 in the first stretching and 2.5 in the second stretching, and one sheet stretched at a ratio of 3.0 in the first stretching and 3.0 in the second stretching. The starting sheet before the first stretching had a width of 7 cm. and a length of 6 cm.

The argon gas-permeability of each of the resulting porous films at 29° C. and its pressure dependence are shown in Table 9.

TABLE 9

| Sample No. | Stretch ratio | | QAr ($\bar{P}=15$ cm. Hg) | QAr ($\bar{P}=35$ cm. Hg) |
|---|---|---|---|---|
| | First stretching | Second stretching | | |
| 2 | 3.0 | 2.0 | $1.70 \times 10^{-5}$ | $1.80 \times 10^{-5}$ |
| 4 | 3.0 | 2.5 | $1.88 \times 10^{-5}$ | $1.96 \times 10^{-5}$ |
| 5 | 3.0 | 3.0 | $1.76 \times 10^{-5}$ | $1.86 \times 10^{-5}$ |

EXAMPLE 10

A 300μ-thick polytetrafluoroethylene sheet was stretched biaxially in the same way as in Example 8 in methanol at 23° C. using a manually operating uniaxial stretcher at a stretch ratio of 3.0 in the first stretching and 2.75 in the second stretching, and also at a ratio of 2.5 in the first stretching and 3.0 in the second. The starting sheet before the first stretching had a width of 7 cm. and a length of 6 cm.

The argon gas-permeability of each of the resulting films at 28° C. and its pressure dependence are shown in Table 10.

TABLE 10

| Sample No. | Stretch ratio | | QAr ($\bar{P}=15$ cm. Hg) | QAr ($\bar{P}=35$ cm. Hg) |
|---|---|---|---|---|
| | First stretching | Second stretching | | |
| 1 | 3.0 | 2.75 | $1.88 \times 10^{-5}$ | $1.95 \times 10^{-5}$ |
| 2 | 2.5 | 3.0 | $1.16 \times 10^{-5}$ | $1.19 \times 10^{-5}$ |

EXAMPLE 11

A 500μ-thick commercially available polytetrafluoroethylene sheet was stretched biaxially in the same way as in Example 8 in a mixed liquid of acetone (50% by weight) and ethanol (50% by weight) at 25° C. using a manually operating uniaxial stretcher. The stretch ratio was 3.0 in the first stretching and 2.5 in the second. The starting sheet before stretching had a width of 7 cm. and a length of 6 cm. The argon gas-permeability of the resulting porous film at 27° C. and its pressure dependence are given in Table 11 below.

TABLE 11

Stretch ratio:
  First stretching _____ 3.0
  Second stretching _____ 2.5
  QAr ($\bar{P}=15$ cm. Hg) _____ $1.20 \times 10^{-5}$
  QAr ($\bar{P}=35$ cm. Hg) _____ $1.24 \times 10^{-5}$

EXAMPLE 12

A 200μ-thick commercially available polytetrafluoroethylene was stretched in the same way as in Example 8 at a stretch ratio of 3.0 and then 2.5 in a different direction using a manually operating uniaxial stretcher in each of the liquids given in Table 12 at 23–26° C. The starting sheet had a width of 7 cm. and a length of 6 cm.

The argon gas-permeability of each of the resulting porous films at 26±2° C. and its pressure dependence are shown in Table 12.

TABLE 12

| Non-solvent liquid | QAr ($\bar{P}=15$ cm. Hg) | QAr ($\bar{P}=35$ cm. Hg) |
|---|---|---|
| Ethanol | $1.53 \times 10^{-5}$ | $1.60 \times 10^{-5}$ |
| 1-butanol | $1.74 \times 10^{-5}$ | $1.89 \times 10^{-5}$ |
| Decane | $1.83 \times 10^{-5}$ | $1.90 \times 10^{-5}$ |
| Undecane | $1.65 \times 10^{-5}$ | $1.72 \times 10^{-5}$ |
| Ethyl acetate | $1.52 \times 10^{-5}$ | $1.63 \times 10^{-5}$ |
| Butyl acetate | $1.46 \times 10^{-5}$ | $1.52 \times 10^{-5}$ |

EXAMPLE 13

A 200μ-thick commercially available polytetrafluoroethylene sheet was stretched in the same way as in Example 8 in n-undecane of varying temperatures using a manually operating uniaxial stretcher. The stretch ratio was 3.0 in the first stretching, and 2.0 in the second. The starting sheet before stretching had a width of 7 cm. and a length of 6 cm. The argon gas-permeability of each of the resulting porous films at 25±2° C. and its pressure dependence are shown in Table 6.

TABLE 6

| Sample No. | Stretching temperature (° C.) | QAr ($\bar{P}=15$ cm. Hg) | QAr ($\bar{P}=35$ cm. Hg) |
|---|---|---|---|
| 1 | 25 | $1.63 \times 10^{-5}$ | $1.69 \times 10^{-5}$ |
| 2 | 80 | $1.51 \times 10^{-5}$ | $1.60 \times 10^{-5}$ |
| 3 | 130 | $1.38 \times 10^{-5}$ | $1.43 \times 10^{-5}$ |

What we claim is:

1. A process for producing a porous article of polytetrafluoroethylene, which comprises stretching a sheet of polytetrafluoroethylene in at least two directions at a stretch ratio of 1.5 to 5 in each direction at a temperature of from −10° C. to 200° C.

2. The process of claim 1, wherein said polytetrafluoroethylene sheet is heat-treated under tension or in a relaxed condition after stretching.

3. The process of claim 1, wherein said polytetrafluoroethylene sheet has a thickness of 20 to 1,000 microns.

4. The process of claim 1, wherein the stretching temperature is 19° C. to 30° C.

5. A process for producing a porous film of polytetrafluoroethylene, which comprises stretching a sheet of polytetrafluoroethylene in at least two directions at a stretch ratio of 1.5 to 5 in each direction at a temperature of from −10° C. to 200° C. in a non-solvent liquid having a surface tension of a degree such that the liquid can penetrate into the fine pores formed during stretching.

6. The process of claim 5, wherein said polytetrafluoroethylene sheet is heat-treated under tension or in a relaxed condition after stretching.

7. The process of claim 5, wherein said polytetrafluoroethylene sheet has a thickness of 20 to 1,000 microns.

8. The process of claim 5, wherein the stretching temperature is 19° C. to 30°.

9. The process of claim 5, wherein said non-solvent liquid is a member selected from the group consisting of methanol, ethanol, propanol, 1-butanol, 1-pentanol, ethyl ether, acetone, carbon tetrachloride, hexane, heptane, octane, decane and n-undecane.

10. The process of claim 1, wherein said polytetrafluoroethylene article comprises fine open cells having a size below about the mean free path of permeating gaseous oxygen or nitrogen.

11. The process of claim 1, wherein said stretching in at least two directions is performed simultaneously.

12. The process of claim 1, wherein said polytetrafluoroethylene sheets has a thickness of 20 to 1000 microns.

13. The process of claim 1 consisting essentially of stretching said sheet.

14. The process of claim 1 wherein said sheet consists essentially of polytetrafluoroethylene.

15. The process of claim 1, wherein said sheet prior to said stretching is substantially non-permeable.

16. The process of claim 10, wherein said polytetrafluoroethylene sheet subsequent to said stretching has a homogeneous physical structure.

17. The process of claim 5, wherein said polytetrafluoroethylene sheet comprises fine open cells having a size below about the mean free path of permeating gaseous oxygen or nitrogen.

18. The process of claim 5, wherein said stretching in at least two directions is performed simultaneously.

19. The process of claim 5, wherein said sheet of polytetrafluoroethylene is stretched while immersed in said non-solvent liquid.

20. The process of claim 19, wherein said polytetrafluoroethylene sheet consists essentially of polytetrafluoroethylene.

21. The process of claim 5, wherein said sheet prior to said stretching is substantially non-permeable.

22. The process of claim 5, wherein said polytetrafluoroethylene sheet subsequent to said stretching has a homogeneous physical structure.

23. The process of claim 2 wherein said heat-treating is at a temperature below the melting point of said polytetrafluoroethylene sheet.

24. The process of claim 6 wherein said heat-treating is at a temperature below the melting point of said polytetrafluoroethylene sheet.

25. The process of claim 5 wherein said non-solvent liquid has a surface tension of not more than 35 dyne/cm.

26. The process of claim 1, wherein said polytetrafluoroethylene sheet prior to stretching is a sintered polytetrafluoroethylene sheet.

27. The process of claim 5, wherein said polytetrafluoroethylene sheet prior to stretching is a sintered polytetrafluoroethylene sheet.

References Cited

UNITED STATES PATENTS 3,315,020    4/1967    Gore _____ 264—120

MAURICE J. WELSH, Primary Examiner

U.S. Cl. X.R.

264—127, 138, 230, 289, 342 RE, 342 R, Dig. 71, Dig. 73